United States Patent [19]
Kanda et al.

[11] Patent Number: 5,980,294
[45] Date of Patent: Nov. 9, 1999

[54] IC CARD LOADING DEVICE

[75] Inventors: Yamato Kanda, Akishima; Hiroshi Takisawa, Hoya; Masao Yamaguchi, Hachioji, all of Japan

[73] Assignee: Olympus Optical Co., Ltd., Tokyo, Japan

[21] Appl. No.: 08/969,467

[22] Filed: Nov. 13, 1997

[30] Foreign Application Priority Data

| Nov. 15, 1996 | [JP] | Japan | 8-305144 |
| Feb. 26, 1997 | [JP] | Japan | 9-042219 |
| Jun. 12, 1997 | [JP] | Japan | 9-155415 |

[51] Int. Cl.⁶ .................................................. H01R 13/62
[52] U.S. Cl. ........................................ 439/326; 361/684
[58] Field of Search .................................. 439/326, 331, 439/929, 929.1, 928, 136–140

[56] References Cited

U.S. PATENT DOCUMENTS 4,430,677  2/1984  Osanai .
5,657,081  8/1997  Kurahashi ................. 348/233

OTHER PUBLICATIONS

"Minature Card/PC Card Adapter", Mitsubishi Plastics, Sep. 10, 1996.

*Primary Examiner*—Lincoln Donovan
*Assistant Examiner*—Eugene G. Byrd
*Attorney, Agent, or Firm*—Pillsbury Madison & Sutro LLP

[57] ABSTRACT

An IC card loading device has an opening end closing lid, a card holder for guiding a loading and removing direction of the IC card, and a connecting portion. The card holder can be operated independently of the opening and closing lid. The IC card is loaded in the card holder when the opening and closing lid is opened. When the opening and closing lid is closed, the card holder moves and the connecting portion of the IC card and the connecting portion of the main body of the IC card loading device are electrically connected.

14 Claims, 8 Drawing Sheets

IC CARD LOADING DEVICE

BACKGROUND OF THE INVENTION

1. Field of the Invention

This invention relates to an IC card loading device, and more particularly, to a device for loading an IC card including semiconductor devices, such as a memory, a central processing unit (CPU) and the like.

2. Description of the Related Art

Recently, various electronic apparatuses have been on the market that use a removable IC card including semiconductor integrated circuits, such as a memory, a CPU and the like for information storage. An example of an IC card is a memory card. Such electronic apparatuses are used by general users.

Figure 11:
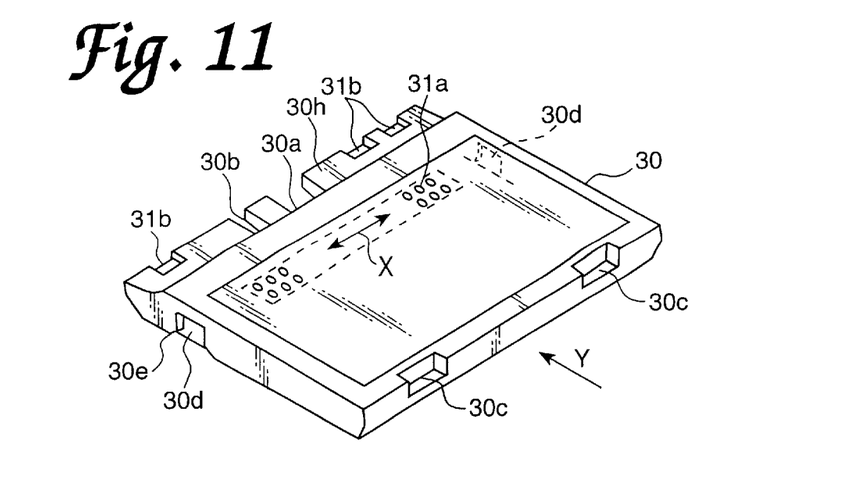
FIG. 11 is a perspective view of the memory card.

As an example, a memory card 30 is shown in FIG. 11. In FIG. 11, the Y axis represents the direction in which the memory card 30 is loaded in the electronic apparatus, and the X axis extends along the upper surface of the card 30 and is perpendicular to the Y axis.

The memory card 30 has a group of contacts 31a of a signal passing connecting portion provided on its lower surface, and a power feeding and insert detecting contact portion 31b, which is a connecting portion for power feeding and insert detecting, provided in its front end portion. These connecting portions of the memory card 30 are electrically connected to a connecting portion or a contact portion of the electronic apparatus when the memory card 30 is loaded.

Further, the memory card 30 has a cutout 30a at the center of its front end portion for positioning the memory card 30 in the X-direction along the connecting portion, and a cutout 30b for discriminating the type of the memory card 30. The memory card 30 also has cutouts 30c in its rear end portion for pushing the memory card 30, and has a couple of recesses 30d on its opposite end sides in the X-direction for positioning the memory card 30 in the Y-direction.

Generally, conventional memory card loading devices in which the memory card 30 is loaded do not have an opening and closing lid for covering the loaded memory card 30. In such a conventional memory card loading device, when the memory card 30 is loaded, the front end portion of the memory card 30 is inserted into a hood portion, and a plane portion of the memory card 30 is pushed so that the memory card 30 is engaged with the device and located at a predetermined position. In this loaded state, a power feeding contact portion and a signal connecting portion of the electronic apparatus are electrically connected to the power feeding and insert detecting contact portion 31b and the contact group 31a of the connecting portion of the memory card 30.

However, in the conventional memory card loading devices, since the memory card 30 is loaded by pushing it directly by hand, the user must manually determine the position and angle of insertion, which may cause an unsuccessful installation that may damage a component. Further, when the memory card 30 is removed, the connecting portion of the electronic apparatus is exposed, which is undesirable for the protection of the apparatus and the prevention of dust.

SUMMARY OF THE INVENTION

An object of this invention is to provide a memory card loading apparatus for loading and removing a memory card easily and reliably.

In order to attain the foregoing and other objects, an IC card loading device according to this invention comprises a connecting portion to be electrically connected to a connecting portion of an IC card when the IC card is loaded in a predetermined position relative to an electronic apparatus, and a card holder for guiding a direction of insertion and removal of the IC card.

DETAILED DESCRIPTION OF THE PREFERRED EMBODIMENT

Referring to the drawings, an embodiment of this invention will now be described.

Figure 1:
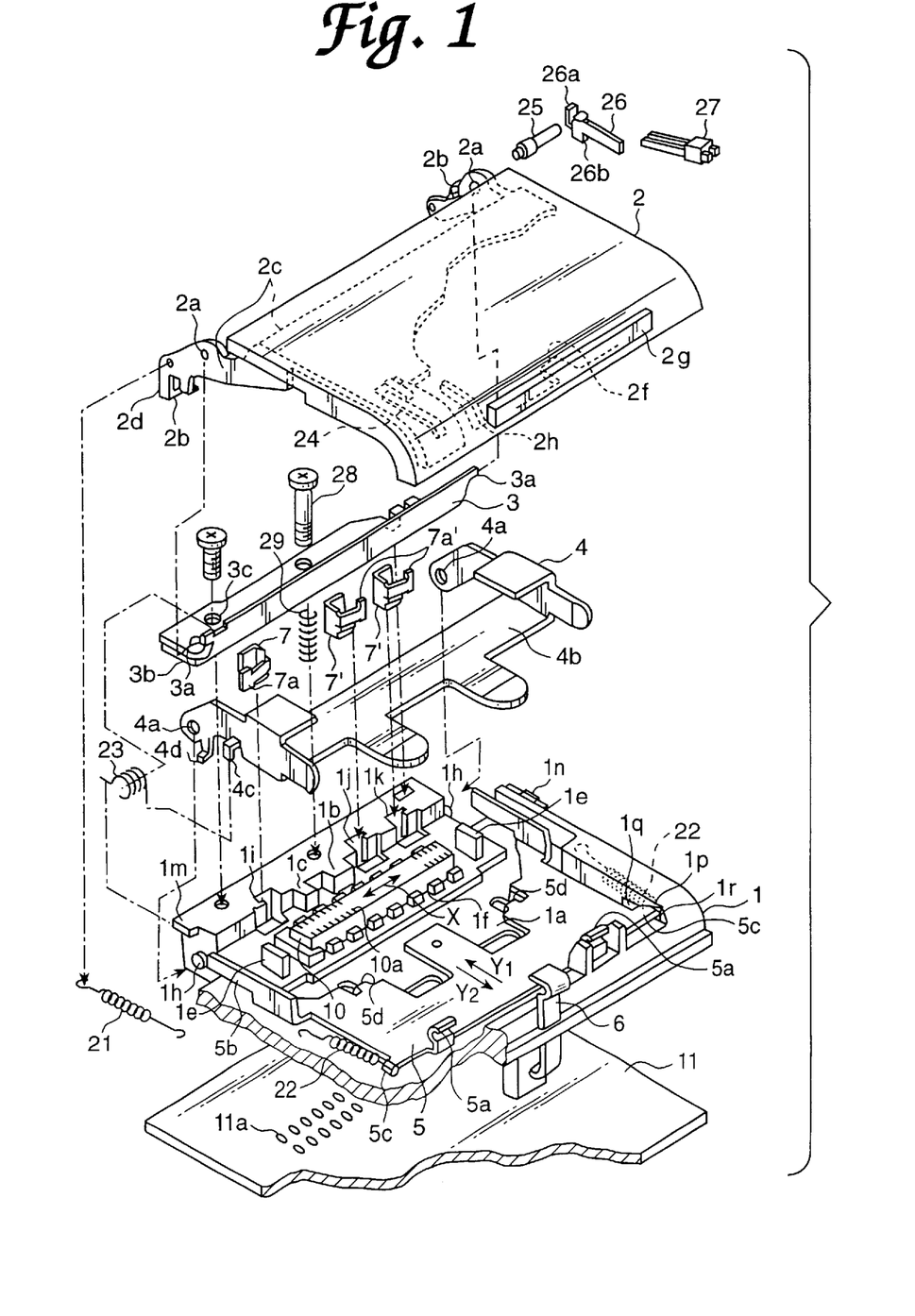
FIG. 1 is an exploded perspective view of a memory card loading device according to an embodiment of this invention.

FIG. 1 is an exploded perspective view of a memory card loading device which is an IC card loading device in accordance with an embodiment of this invention.

The memory card loading device of this embodiment is integrated into an electronic apparatus or the like. A memory card 30 shown in FIG. 11, which is an IC card, is loaded in and removed from the memory card loading device.

When the memory card 30 is loaded in a card loading portion 1a of the memory card loading device, contacting portions 7a and 7a' of terminal plates 7 and 7' of the main body 1 of the memory card loading device and a power feeding and insert detecting contact portion 31b (see FIG. 11) of the memory card 30 are connected. The contacting portions 7a and 7a' are power feeding and insert detecting electric connecting portions. At the same time, a connection and conduction portion 10a of a connecting portion 10 of the main body 1 and a group of contacts 31a (see FIG. 11) of a connecting portion of the memory card 30 are connected. The connection and conduction portion 10a is an electric connecting portion for passing digital signals. In this way, electricity can be conducted and signals can be passed between the main body, and the memory card 30 of the memory card loading device.

Referring to FIGS. 1 to 5, the structure of the memory card loading device is described in detail.

As shown in FIG. 1, the main body 1 of the memory card loading device is provided with the memory card loading portion 1a. The memory card loading portion 1a is provided with an insertion cavity If into which the connecting portion 10 of the main body is inserted, a positioning projection 1b for positioning the memory card in the X-direction, a projection 1c for detecting the type of the memory card, and a couple of protruding portions 1e for aligning the memory card in the Y-direction. The protruding portions 1e are positioned so as to sandwich the connection end conduction portion 10a of the connecting portion 10, which extends in the X-direction, and oppose to each other. The connecting portion 10 of the main body is an electric connecting portion formed by a conductive rubber. The conductive rubber has a multilayer conductive portion with minute pitches.

The positioning projection 1b can fit in the cutout 30a (see FIG. 11) which positions the memory card (see FIG. 11) in the X-direction. The projection 1c can fit in the cutout 30b (see FIG. 11) for detecting the type of the memory card. The protruding portions 1e for aligning the memory card can fit with the couple of recesses 30d (see FIG. 11). The recesses 30d align the memory card 30 in the Y-direction (insertion direction).

A positioning plate 3 which is a member for positioning the front end of the memory card is fixed to the main body 1 by screws 28. Referring to the side view shown in FIG. 8 in which the memory card 30 is in a loaded state, the front end portion of the memory card 30 provided with the power feeding and insert detecting contact portion 31b and the like is inserted in the under portion of the positioning plate 3. The under surface of the positioning plate 3 abuts on and pushes down the top surface 30h of the front end portion of the memory card 30. In this way, the position of the memory card 30 in the vertical direction is determined.

Referring again to FIG. 1, the positioning plate 3 has lid supporting portions 3a which are rotating shaft portions. The lid supporting portions 3a rotatably support the opening and closing lid 2 via supporting holes 2a. Thus, the positioning plate 3 is also used as a rotating shaft or a rotation axis of the opening and closing lid 2. This enables a reduction in the number of parts and cost. The opening and closing lid 2 effectively protects the memory card 30 end the memory card loading device. Further, in this embodiment, as described herein below, the opening and closing lid 2, the positioning plate 3, and a printed circuit board 11 are electrically connected. Therefore, the memory card 30 is protected from static electricity by grounding the opening and closing lid 2.

The opening and closing lid 2 is provided with a projection 2h for pushing down the memory card, an engaging projection 2f for maintaining the closed state of the opening and closing lid 2, a lid opening projection 2g, and the like.

Further, a metal reinforcing plate 2c is adhered to the back side of the opening and closing lid 2. An elastically deformable card pushing plate 24 is supported by the opening and closing lid 2 via the reinforcing plate 2c.

As shown in FIG. 1, in addition to the supporting holes 2a, the reinforcing plate 2c is provided with pushing projections 2b and a lifting projection 2d. The pushing projections 2b are a releasing members for releasing the fixed memory card 30 by pushing and sliding the slide plate 5 which is a fixing member for fixing the memory card 30. The lifting projection 2d is a pushing member for pushing and lifting a card holder 4 (described herein below) in an opening direction.

Figure 5:
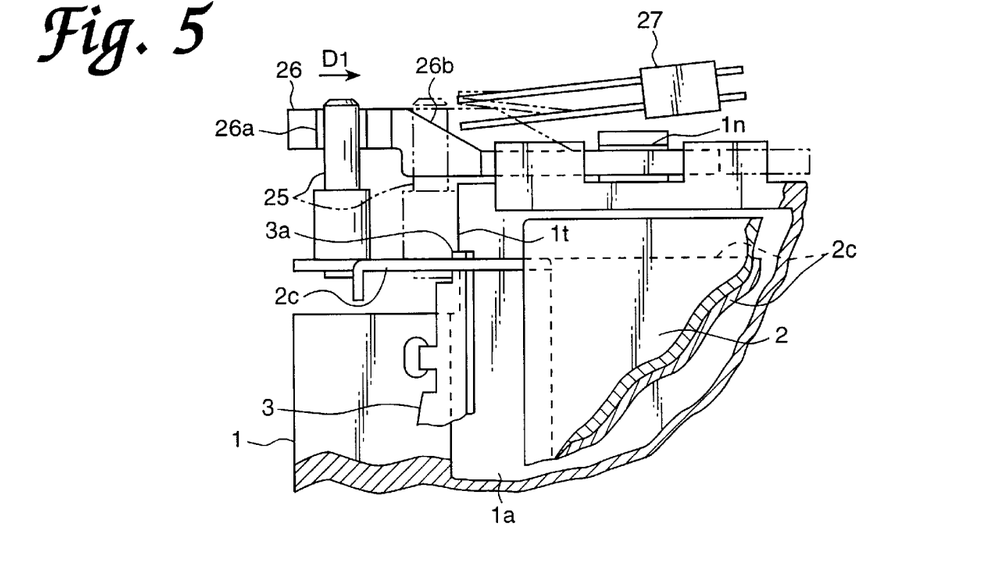
FIG. 5 is a partial plane view of a change-over switch operating portion in the memory card loading device of FIG. 1.

Further, as shown in FIG. 5, a switch operating pin 25 which is a switch operating member for operating a change-over switch 27 via an operating cam plate 26 is provided on or adhered to the reinforcing plate 2c by caulking and the like.

The operating cam plate 26 is slidably held by a guiding portion 1n of the main body, and is connected to the switch operating pin 25 via a U-shaped channel 26a. The operating cam plate 26 pushes the contacting portion of the change-over switch 27 via a cam 26b of the operating cam plate 26 and turns the change-over switch 27 on and off.

The change-over switch 27 switches the conducting state of an electric signal conducted between the connecting portion 10 of the main body and the connecting portion of the memory card 30. With the opening operation of the opening and closing lid 2, the switch operating pin 25 moves in the D1 direction. The switch operating pin 25 then switches the change-over switch 27 on. As a result of this change in the state of the change-over switch 27, the conducting state of the connecting portions for controlling the process is turned from on to off. Then, the conduction of an electric signal between the connecting portion 10 of the main body and the connecting portion of the memory card 30 is disabled. The switching operation of the change-over switch 27 is executed prior to release of the fixed memory card 30. The fixed memory card 30 is released when a slide plate 5 (see FIG. 8) is pushed and slid in the Y2 direction while the opening and closing lid 2 is opening.

Referring back to FIG. 1, the main body 1 is provided with supporting pin portions 1h. Directing holes 4a of the card holder 4 are fitted in the supporting pin portions 1h so that the card holder 4 is rotatably supported. The card holder 4 is positioned between the main body 1 and the opening and closing lid 2. The card holder 4 can be operated independent of the main body 1 and the opening and closing lid 2. The card holder 4 has a card inserting portion 4b and determines the direction of and guides the memory card 30 during loading and unloading. The supporting pin portions 1h are provided at the lower portions of the lid supporting portions 3a of the positioning plate 3.

A slidable slide plate 5 is provided in the memory card loading portion 1a of the main body 1 via projections 5d. The slide plate 5, which is a fixing member for fixing the memory card 30, receives the bottom surface of the memory card 30. The portion which receives the memory card 30 is flat. The slide plate 5 is provided with card pushing portions 5a and pushed portions 5b. The card pushing portions 5a are engaged with the cutouts 30c of the memory card 30. The pushed portions 5b are pushed and operated by the pushing projections 2b of the opening and closing lid 2.

More particularly, the pushed portions 5b are pushed and operated by the pushing projections 2b of the opening and closing lid 2 so that the slide plate 5 moves from a card holding position to a card releasing position when the opening and closing lid 2 is opened.

Figure 2:
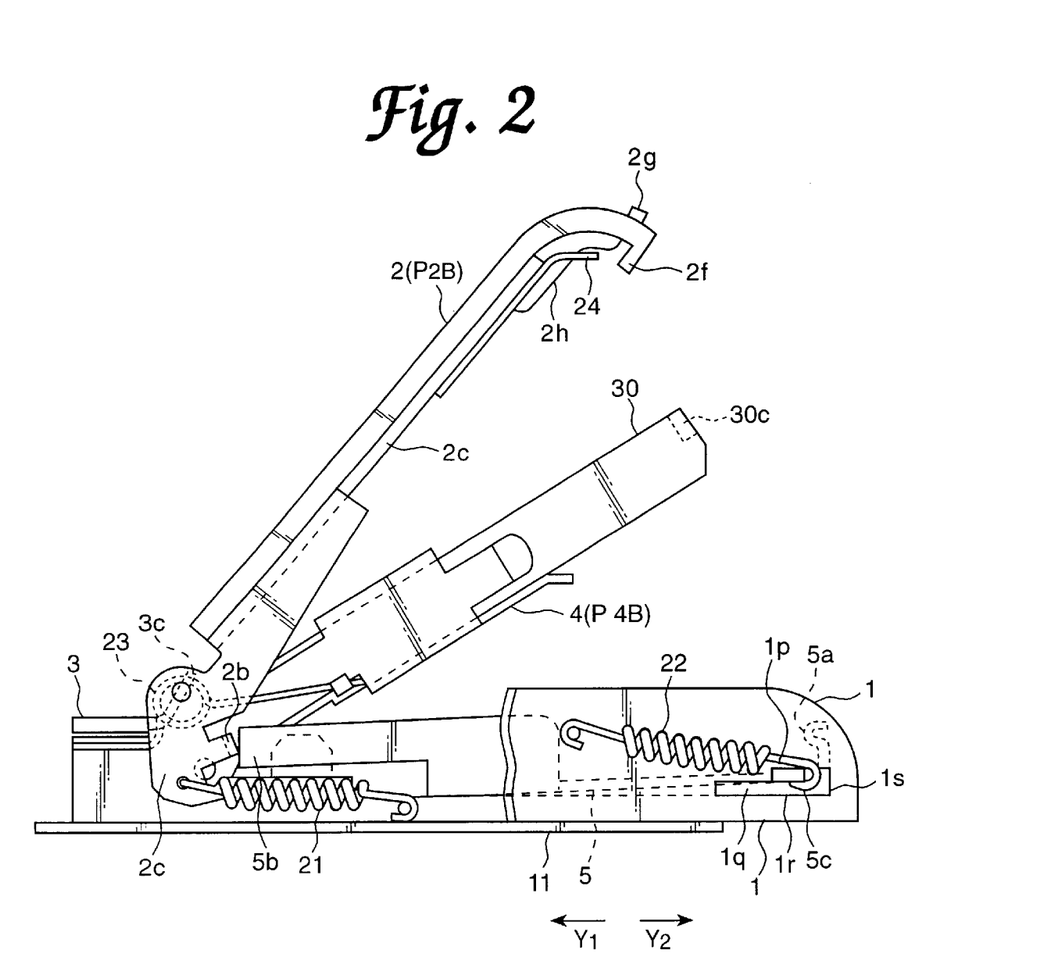
FIG. 2 is a side view showing suspension structures of urging springs in the memory card loading device of FIG. 1.
Figure 3:
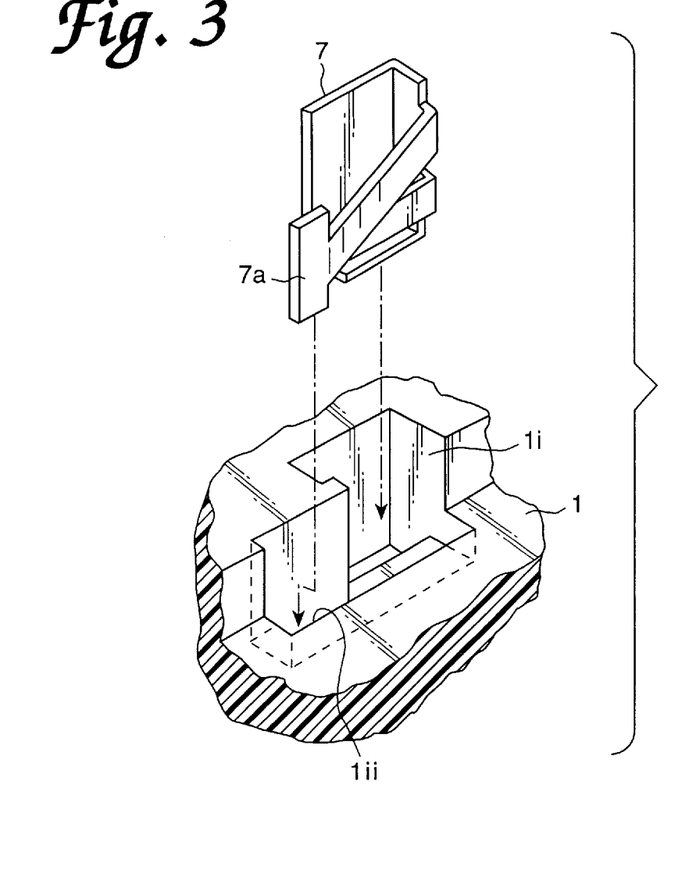
FIG. 3 is en exploded partial perspective view of a terminal plate and a terminal plate mounting portion in the memory card loading device of FIG. 1.

As shown in FIG. 2, an urging spring 21 having one end suspended by the main body 1 urges the opening and closing lid 2 in the opening direction.

The card holder 4 guides the memory card 30 so as to be loaded easily and surely. An urging spring 23 which is an urging member urges the card holder 4 in the opening direction. The urging spring 23 is a torsion spring. A coil portion of the urging spring 23 is fitted in a recess 3c (see FIG. 1) provided in the positioning plate 3. One end portion of the urging spring 23 is suspended and supported by a hook portion 4c (see FIG. 1) of the card holder 4. The other end portion of the urging spring 23 is suspended and supported by a supporting portion 1m (see FIG. 1) of the main body 1.

A couple of urging springs 22 urge the slide plate 5 in the direction that the memory card 30 is inserted and stopped, that is, in the direction shown by an upward slanting arrow Y1 in FIG. 1. One end of each urging spring 22 is suspended by the main body 1. The other ends are suspended and supported by a couple of arm portions 5c (see FIG. 1) which protrude towards the outward sides of the slide plate 5.

The arm portions 5c of the slide plates are inserted through a couple of opening portions 1r which are shaped like the letter L. (Both of the opening portions 1r do not necessarily have to be L-shaped. It is possible to have only one opening portion 1r that is L-shaped.) The opening portions 1r are engaging members provided in side portions of the main body 1. When the memory card 30 is fixedly positioned and is in a loaded state (see FIG. 8), the arm portions 5c are positioned in the lower portions 1q of the opening portions 1r. In this state, the slide plate 5 is positioned above and approximately parallel to the bottom surface of the main body 1, and the card pushing portions 5a are engaged with the memory card 30. The card holder 4 is also positioned above and approximately parallel to the bottom surface of the main body 1.

Figure 10:
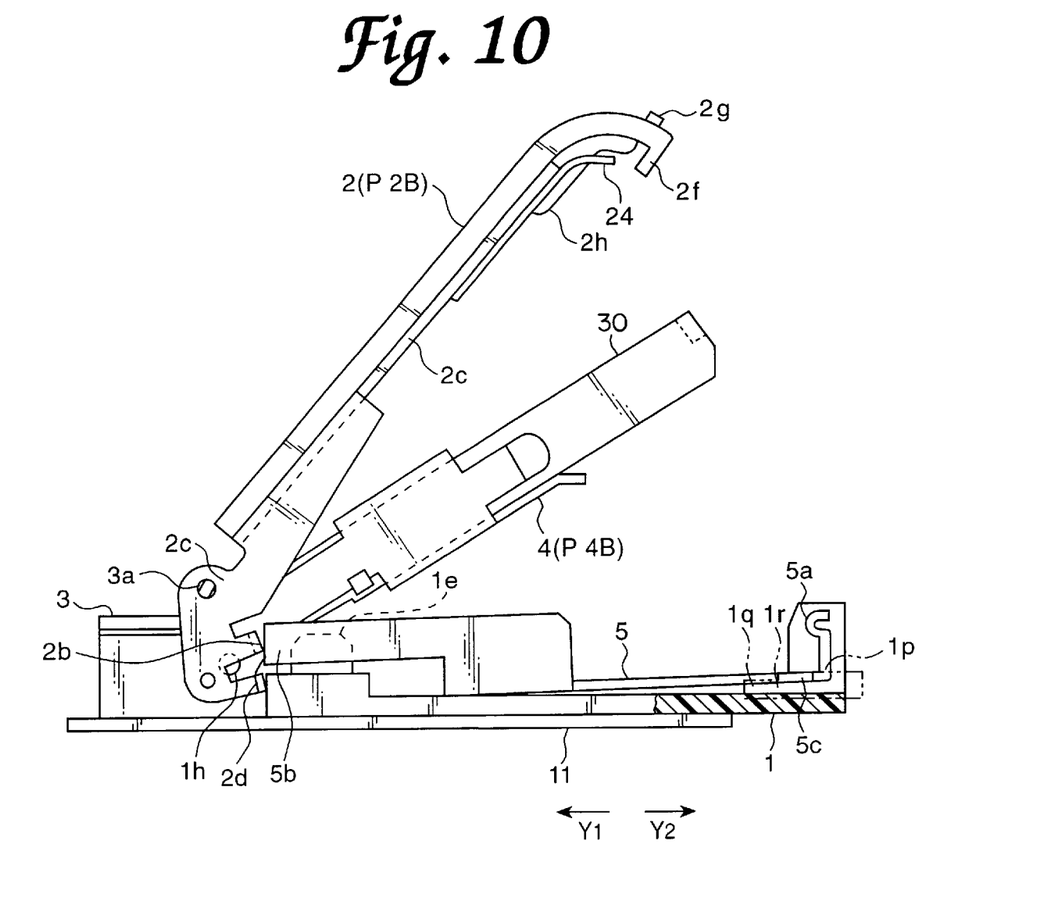
FIG. 10 is a side view of the memory card loading device of FIG. 1 when the opening and closing lid and the card holder are completely opened to remove the memory card.

As shown in FIGS. 2 and 10, when the fixed memory card 30 is released, the arm portions 5c are positioned in the upper portions 1p of the opening portions 1r. The slide plate 5 is moved from its engaged position towards the Y2 direction so that the memory card 30 is released. The slide plate 5 is slightly inclined upward so that the end portion provided with the card pushing portions 5a is separated from the bottom surface of the main body 1.

Accompanied by the opening operation of the opening and closing lid 2, the slide plate 5 moves to a predetermined position and the fixed memory card 30 is released, thereby improving operability for removing the memory card 30. Likewise, the position of the slide plate 5 is suitable for loading the memory card 30.

The urging force of the urging springs 22 for urging the slide plate 5 in the Y1 direction is stronger than the urging force of the urging spring 21 for urging the pushed portions 5b. Therefore, when the fixed memory card 30 is released from its fixed position, the arm portions 5c are positioned in the upper portions 1p of the opening portions 1r, and the opening and closing lid 2 is opened, the urging springs 22 urge the arm portions 5c which abut on the step portions of the opening portions 1r. The opening of the opening and closing lid 2 is restricted by the pushed portions 5b of the slide plate 5. Thus, the opening and closing lid 2 is rotated slightly from its maximum opening position towards its closing direction. The position of the opening and closing lid 2 in this state is shown by a second opening position P 2B (see FIGS. 2 and 10). In this way, the opening portions 1r engage with the slide plate 5 and support the slide plate 5 as engaging members. Therefore, the opening and closing lid 2 is easily maintained in its opening position when the memory card 30 is released from its fixed position.

Referring back to FIG. 1, the main body 1 is provided with terminal mounting hole portions 1i, 1j, and 1k. A terminal plate 7 is mounted on the terminal mounting hole portion 1i. Terminal plates 7' are mounted on the terminal mounting hole portions 1j and 1k (see FIG. 3). In this state, the positioning plates push the terminal plates 7 and 7' against the printed circuit board 11 via an insulating sheet 3b. The terminal plates 7 and 7' are held as described above and are electrically connected to the circuit of the printed circuit board 11.

The terminal plate 7 is provided with an elastically deformable contacting portion 7a. The contacting portion 7a is in a free state when the terminal plate 7 is not mounted on the terminal mounting hole portion 1i. When the terminal plate 7 is mounted on the terminal mounting hole portion 1i, the contacting portion 7a is bent and inserted into a wall portion 1ii (see FIG. 3) which is a holding portion provided in the vicinity of the terminal mounting hole portion 1i. The position where the contacting portion 7a stops when inserted into the wall portion 1i is shown by P 7B (see FIGS. 6 and 7).

Figure 8:
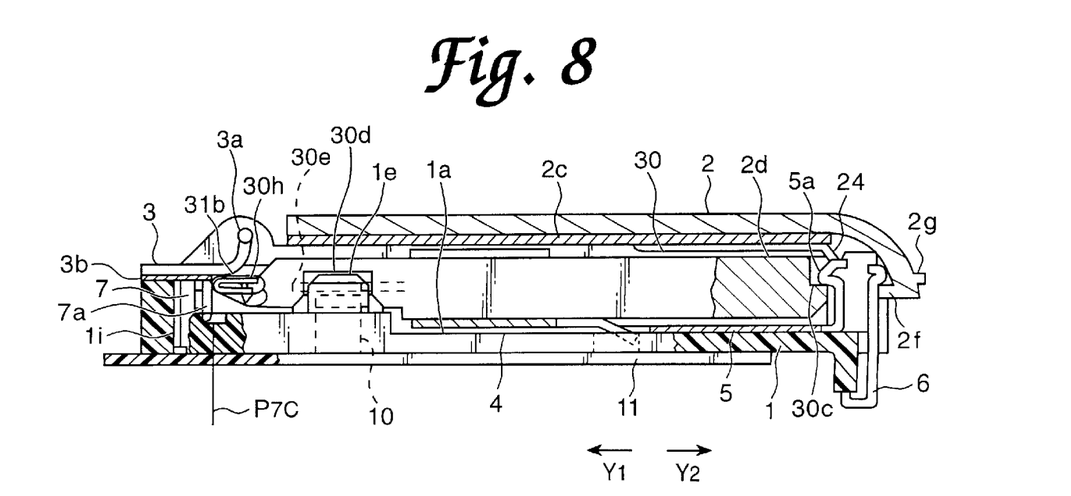
FIG. 8 is a side view of the memory card loading device of FIG. 1 when the opening and closing lid is further pushed down to load the memory card completely.

When the memory card 30 is loaded in the memory card loading portion 1a, as shown in FIG. 8, the contacting portion 7a is further pushed by the power feeding and insert detecting contact portion 31b provided at the front end of the memory card 30. Then, the contacting portion 7a is retracted to a position P 7C which is a position where the contacting portion 7a stops. The position P 7C shows where the contacting portion 7a stops when the power feeding and insert detecting contact portion 31b abuts on the contacting portion 7a.

As shown in FIG. 1, the shapes of the terminal plates 7' are symmetrical with respect to the terminal plate 7. The terminal plates 7' are mounted on the main body 1 in the same state the terminal plate 7 is mounted on the main body 1. Thus, the shapes of the terminal mounting hole portions 1j and 1k of the main body 1 are symmetrical with respect to the terminal mounting hole portion 1i. Wall portions for holding the contacting portions 7a' are provided in the vicinity of the terminal mounting hole portions 1j and 1k.

Figure 4:
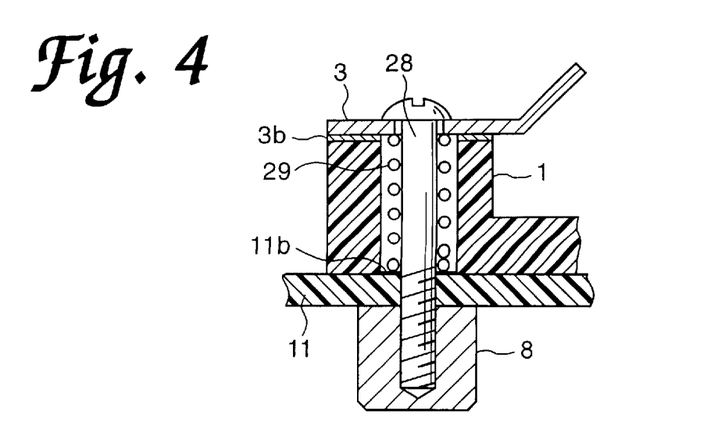
FIG. 4 is a partial cross-sectional view of an earth structure in the memory card loading device of FIG. 1.

As shown in FIG. 4, the positioning plate 3 is secured with a screw 28 which is inserted in a conductive spring 29. The secured positioning plate 3 sandwiches and holds the printed circuit board 11 with a mounting member 8. The positioning plate 3 is electrically connected with a land 11b which is used for chassis grounding. Therefore, referring to FIG. 1, the positioning plate 3, the reinforcing plate 2c of the opening and closing lid 2, the card holder 4, and the urging springs 21, 22, and 23 are electrically connected, and they are grounded on the printed circuit board 11.

Next, referring to the side views shown in FIGS. 6 to 10, operations of different phases of loading and removing the memory card 30 in and from the memory card loading device constructed such as described above are described.

Figure 6:
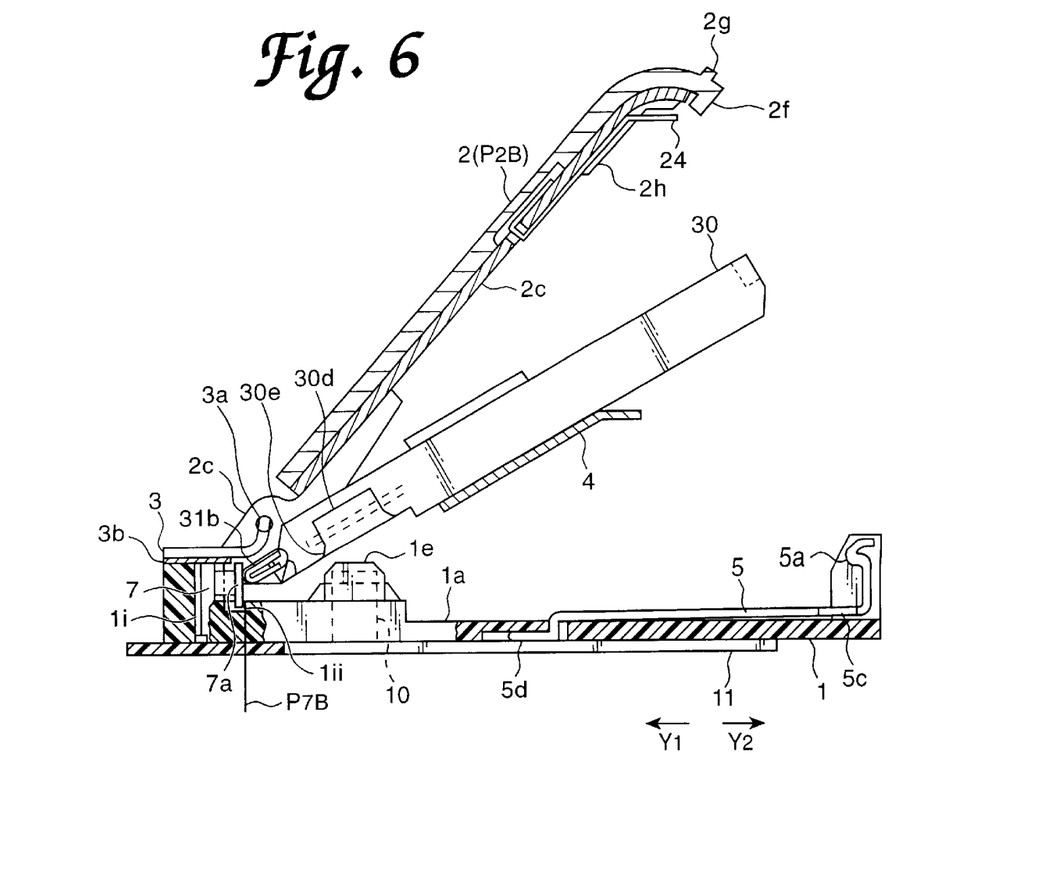
FIG. 6 is a side view of the memory card loading device of FIG. 1 when a memory card is inserted into a card holder.
Figure 7:
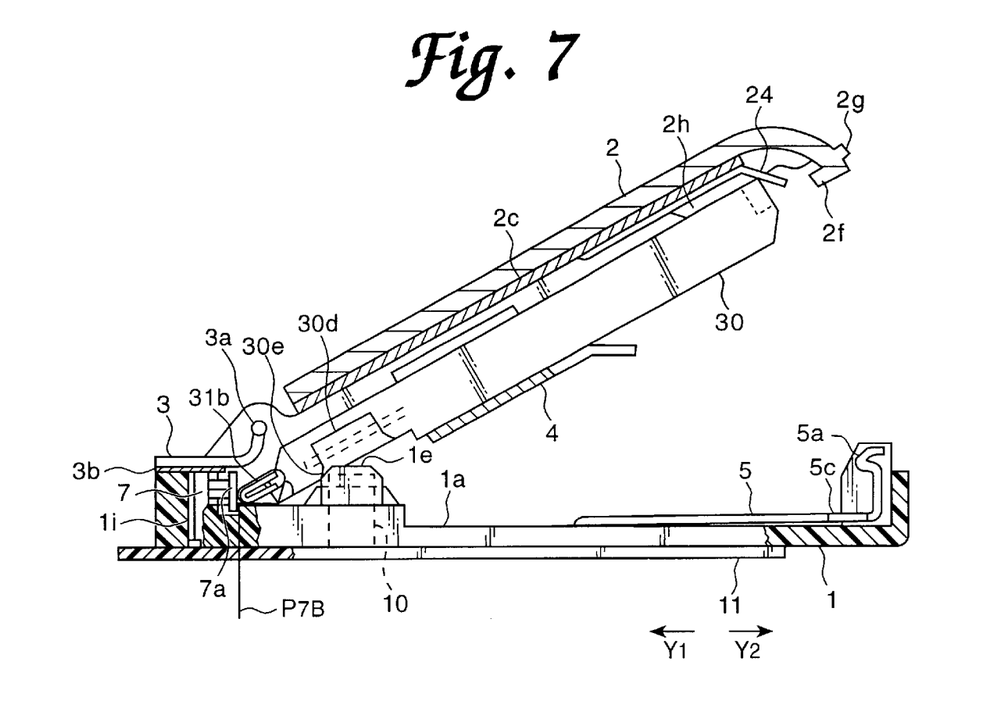
FIG. 7 is a side view of the memory card loading device of FIG. 1 when an opening and closing lid is pushed to contact the memory card.
Figure 9:
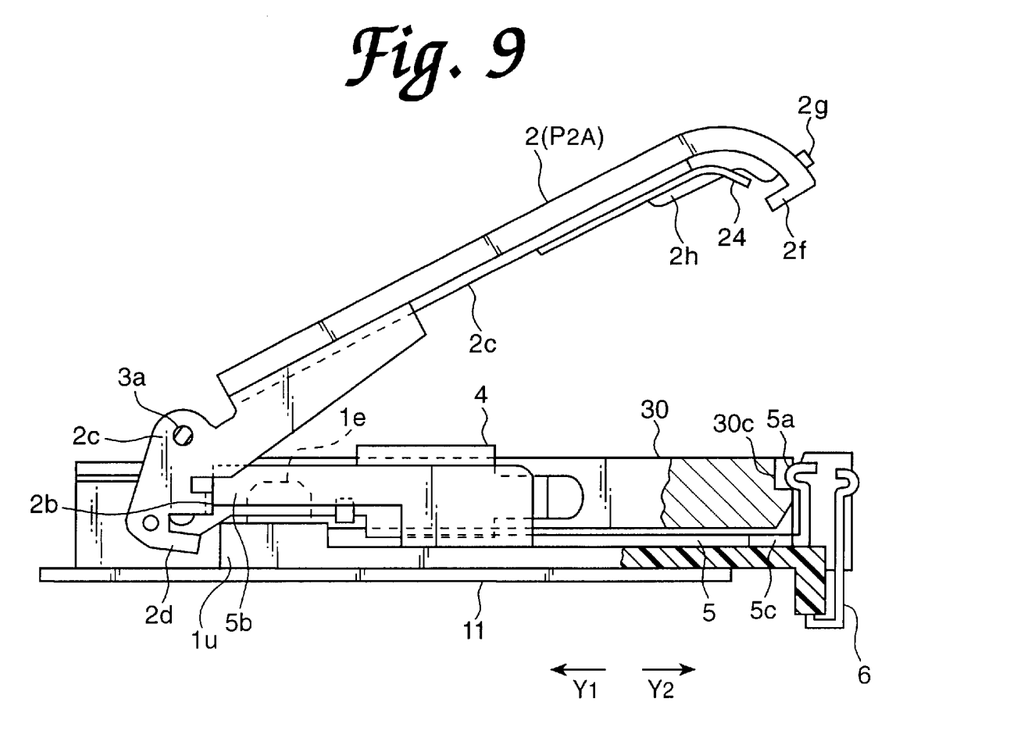
FIG. 9 is a side view of the memory card loading device of FIG. 1 when only the opening end closing lid is opened to remove the memory card.

FIG. 6 is a schematic side view showing a state of the memory card loading device when the memory card is inserted into the card holder. FIG. 7 is a schematic side view showing a state of the memory card loading device when the opening and closing lid 2 is pushed down after the memory card is inserted. In FIG. 7, the opening and closing lid 2 contacts the memory card. FIG. 8 is a schematic side view showing a state of the memory card loading device shown in FIG. 7 when the opening and closing lid 2 is further pushed down to load the memory card 30 completely. Further, FIG. 9 is a side view showing a state of the memory card loading device when only the opening end closing lid 2 is opened to remove the memory card. FIG. 10 is a side view of the memory card loading device when the opening and closing lid 2 and the card holder 4 are completely opened.

First, an operation for loading the memory card 30 is described. As shown in FIG. 6, when the opening and closing lid 2 is opened, the memory card 30 is inserted into the card holder 4. In this state, the memory card 30 advances into the card holder 4 owing to its own weight. The power feeding end insert detecting contact portion 31b contacts the contacting portion 7a. The position of the contacting portion 7a at this time is shown by P 7B. Next, as shown in FIG. 7, when the opening and closing lid 2 is being closed, the opening and closing lid 2 and the memory card 30 contact each other. The contacting portion 7a is bent a predetermined amount so as to be positioned as shown by the load position P 7B. In this state, the front end portion of the memory card 30 has reached the load position P 7B owing to the weight of the memory card 30. Therefore, when the memory card 30 continues to slide down, rounded-corner portions 30e of the recesses 30d which align the memory card with the main body slide along the slant faces of the protruding portions 1e which align the main body 1 with the memory card 30. Thus, the memory card 30 smoothly fits with the protruding portions 1e of the main body.

While the opening and closing lid 2 is moving down, the memory card 30 also moves down, pushed by the opening and closing lid 2 via the projection 2h and the card pushing plate 24. The under surface of the memory card 30 finally pushes the slide plate 5. The arm portions 5c of the slide plate 5 then move down from the upper portions 1p of the opening portions 1r (see FIG. 2) of the main body 1 to the lower portions 1q. The engagement of the arm portions 5c with the step portions of the opening portions 1r is disengaged. The urging force of the urging springs 22 (see FIG. 2) moves the slide plate 5 in the Y1 direction. Owing to the movement of the slide plate 5, the card pushing portions 5a of the slide plate 5 engage with the cutouts 30c (see FIG. 11) for pushing and holding the memory card 30. Thus, the memory card 30 is fixed in the loading position. In this way, the slide plate 5 fixes the position of the memory card 30 in response to the closing operation of the opening and closing lid 2.

FIG. 8 shows a loading state of the memory card 30 when the opening and closing lid 2 is completely closed. In this state, the recesses 30d of the memory card 30 completely fit with the protruding portions 1e of the main body 1. The contacting portions 7a and 7a' are further pushed by a predetermined amount. The contacting portions 7a and 7a' are then held at a predetermined contacting position P 7C. Contacting portions 7 and 7a and the power feeding and insert detecting contact portion 31b are electrically connected under appropriate contact pressure. The terminal plate 7' and the contacting portion 7a' are not shown in FIG. 8.

The connecting portion 10 of the main body 1 is compressed for a predetermined amount and, therefore, is connected with the connecting portion of the memory card 30. Thus, the connecting portion 10 and the connecting portion of the memory card 30 are electrically connected. At this time, the X axis (see FIG. 1) matches with the center axis of the arrangement of the contact group 31a (see FIG. 11) of the connecting portion of the memory card 30. The X axis is an axis extending along the center axis of the arrangement of the connection end conduction portion 10a.

In the above state, the top surface 30h of the end portion of the memory card 30 contacts the bottom surface of the positioning plate 3. Thus, the position of the front end portion of the memory card 30 in the vertical direction is properly determined and maintained.

Further, in the above state, the top surface of the slide plates and the top surface of the bottom portion of the card holder 4 are substantially even, that is, on the same plane.

Therefore, the memory card loading device can be compact in size when the slide plate 5 and the bottom portion of the card holder 4 are arranged in this way.

Next, the operation for removing the memory card 30 is described. First, the memory card loading device is in the state shown in FIG. 8. When the lid opening projection 2g of the opening and closing lid 2 is pulled up, the opening and closing lid 2 rotates in the opening direction, owing to the urging force of the urging spring 21 (see FIG. 2). When the urging force of the urging spring 21 is the only force exerted on the opening and closing lid 2, as shown in FIG. 9, the opening and closing lid 2 is held at a first opening position P 2A. The opening position P 2A is a position where the opening and closing lid 2 is held when the pushing projections 2b of the opening and closing lid 2 end the pushed portions 5b of the slide plate in a card stopping position contact with each other.

When the opening and closing lid 2 is held at the first opening position P 2A, the slide plate 5 is not moved in the Y2 direction which is a direction for releasing the slide plate 5. Therefore, the memory card 30 is fixed and held in a loaded state. Thus, the connecting portion is electrically connected. On the other hand, before the opening and closing lid 2 reaches the first opening position P 2A, the switch operating pin 25 of the opening and closing lid 2 shown in FIG. 5 moves in the D1 direction, with the movement of the opening and closing lid 2, and the change-over switch 27 is then turned on. Based on the on signal of the change-over switch 27, a controlling circuit of the electronic apparatus provided on the printed circuit board 11 (see FIG. 1) decides the situation that the connection of the connecting portion is going to be disabled. After the decision is made, the controlling process of turning off the connecting portion is executed, and conduction of an electric signal for controlling process is disabled. In this way, a controlling process for turning off the connecting portion electrically is executed when the memory card 30 is still fixed in a loaded state, and the connecting portions of both sides are still physically connected. Thus, the data in the memory card 30 is secured.

After the state of the memory card loading device shown in FIG. 9, when the opening and closing lid 2 is further opened by an operation force in the opening direction, the pushing projections 2b push the pushed portions 5b of the slide plate 5 as shown in FIG. 10. The slide plate 5 moves in the Y2 direction end slightly rotates in the opening direction, and the fixed memory card 30 is released. The pushing projections are releasing members for the slide plates and the fixed memory card 30. Namely, the slide plate 5 moves to a predetermined position in response to the opening movement of the opening and closing lid 2. The movement of the slide plate 5 thus releases the fixed memory card 30. The card holder 4 rotates in the opening direction, urged by the urging force of the urging spring 23 (see FIG. 2). The card holder 4 contacts the positioning plate 3 and the positioning plate 3 determines the range of rotation of the card holder 4. Therefore, the card holder 4 stops at an opening position P 4B where the memory card 30 can easily be loaded and removed.

Namely, the card holder 4 moves to the opening position P 4B when the opening and closing lid 2 is opened, and determines the loading and removing direction of the memory card 30. In this way, the memory card loading device is compact in size, because the position determining plate 3 is used as a member for determining the opening position of the card holder 4.

Moreover, it is easy to load and remove the memory card 30, because the fixing operation of the memory card 30 is made in response to the closing movement of the opening and closing lid 2 and because the releasing operation of the memory card 30 is made in response to the opening movement of the opening and closing lid 2.

Figure 12:
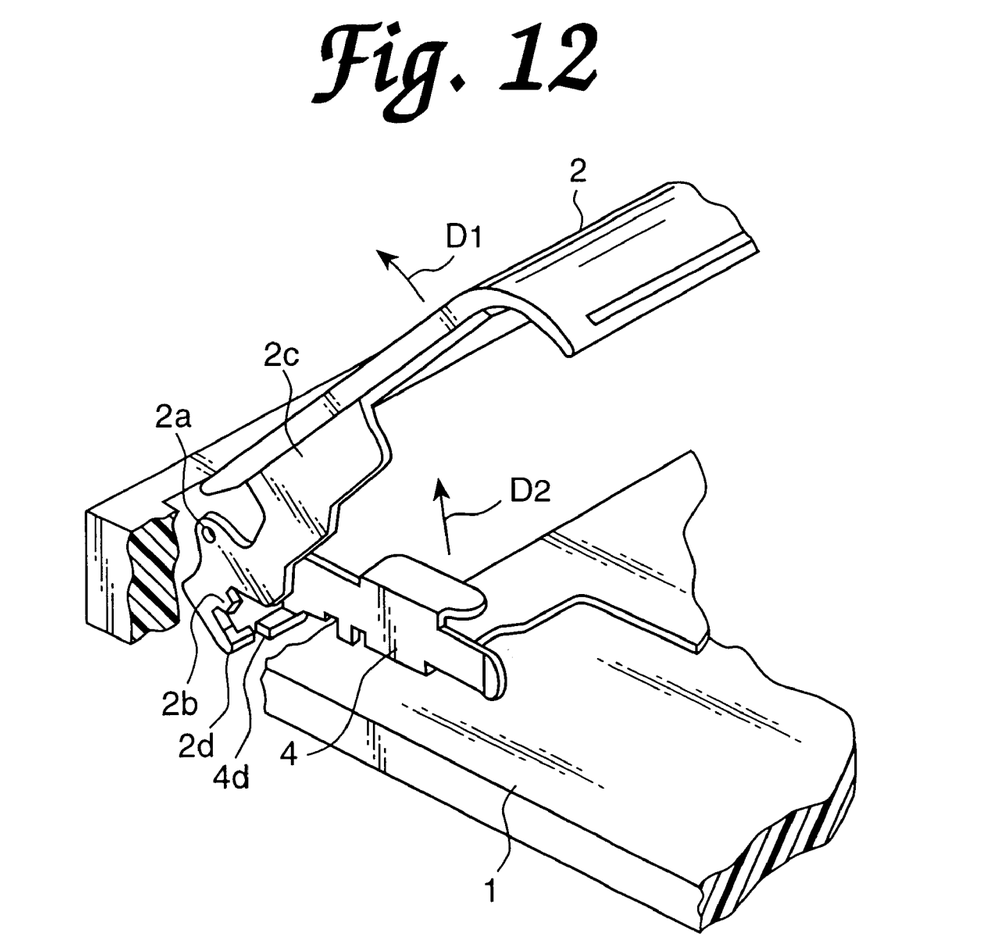
FIG. 12 is a partial perspective view of the memory card loading device of FIG. 1 when the lifting projection of the opening end closing lid pushes the card holder to remove the memory card.

However, in this case, the adhesion strength between the contact group 31a of the memory card 30 and the connection and conduction portion 10a of the connecting portion 10 constructed by conductive rubber may be larger than the urging force of the urging spring 23 (see FIG. 2) of the card holder 4. Thus, the card holder 4 may not be opened. For the card holder 4 to open, the lifting projection 2d of the opening and closing lid 2 pushes the pushed projection 4d of the card holder 4 in the lifting direction (upward direction) after the opening and closing lid 2 is rotated in the opening direction and the fixed memory card 30 is released (see FIG. 12). As described above, the lifting projection 2d as a pushing member assists the urging force of the urging spring 23 to open the opening and closing lid 2. Therefore, the card holder 4 is surely rotated in the counterclockwise opening direction, united with the rotation of the memory card 30. The contact group 31a of the memory card 30 which is adhered to the connecting portion 10 of the main body is thus detached from the connecting portion 10. According to the memory card loading device of this embodiment, even if the adhesion strength between the connection and conduction portion 10a of the connecting portion 10 of the main body and the contact group 31a of the memory card 30 is large when removing the memory card 30, such that the card holder 4 is not opened by the urging force of the urging spring, the opening force of the opening and closing lid 2 forcibly lifts the card holder 4 in the opening direction and rotates the card holder 4 up to where it reaches the opening position P 4B.

Therefore, when the opening and closing lid 2 is opened to remove the memory card 30, the card holder 4 surely rotates in the opening direction and the memory card 30 is surely removed from the memory card loading device. Moreover, the increase in production costs, if any, is small because the structure of the memory card loading device in which the reinforcing plate 2c of the opening and closing lid 2 is simply provided with the lifting projection 2d for lifting the card holder 4, and the card holder 4 is simply provided with the pushed projection 4d.

The mechanism is not only applied to a card holder, but can widely be applied to a holding mechanism which fixes a movable member being urged in a certain direction to a predetermined position.

As shown in FIG. 5, when the opening and closing lid 2 is further rotated in the opening direction, the switch operating pin 25 contacts the stopper portion 1t of the main body 1, thereby determining the rotating position of the opening and closing lid 2. In this way, the switch operating pin 25 operates also as a member for determining the opening position of the opening and closing lid 2. Therefore, the number of construction parts and production costs are reduced.

In the above opening state, the urging springs 22 (see FIG. 2) are urged so as to pull the arm portions 5c (see FIG. 2) of the slide plate 5 in the upward slanting direction. When the operating force applied to the opening end closing lid 2 (see FIG. 2) is released, as shown in FIG. 10, the opening and closing lid 2 is held at a second opening position P 2B, separated from the memory card 30 by a predetermined angle. When the opening and closing lid 2 is at this position, which means that the opening and closing lid 2 and the card holder 4 are opened, the memory card 30 can easily be removed from the memory card loading device without hitting the protruding portions 1e of the main body 1.

As described above, the card holder 4 operates independently of the main body 1 and the opening and closing lid 2. Utilizing this characteristic, the opening operation of the opening and closing lid 2 has two stages. In the first stage, the opening and closing lid 2 stops at the opening position P 2A. In this stage, the slide plate 5 has not yet released the fixed memory card 30. In the second stage, the opening and closing lid 2 stops at the opening position P 2B. In this stage, the fixed memory card 30 is released. Thus, data recorded in the memory card is protected, because there is time to turnoff the connecting portion electrically in controlling process before the connection between the connecting portions of the main body 1 and the memory card 30 are physically released.

As described above, according to the memory card loading device of this embodiment, the memory card 30 is easily inserted, because the card holder 4 and the opening and closing lid 2 are held, separated at a predetermined angle when the memory card 30 is being inserted.

Further, when removing the memory card 30, the opening and closing lid 2 is opened and is stopped at a first opening position P 2A (see FIG. 9). The loaded state of the memory card 30 is temporarily maintained. The change over switch 27 (see FIG. 5) is operated during this operation. The controlling processes, such as reading and writing data, are canceled before the connected portions are mechanically detached. After the controlling processes are canceled, the opening and closing lid 2 is rotated in the opening direction. During the rotation, the memory card 30 is released. Then, the connecting portions become non-conductive because they are no longer electrically connected. As a result, data recorded in the memory card 30 is secured.

Further, the memory card 30 is easily removed, because the opening and closing lid 2 is positioned and maintained at the second opening position P 2B (see FIG. 10), separated from the card holder 4.

What is claimed is:

1. An IC card loading device for loading an IC card having a connecting portion, comprising:

a main body having a connecting portion provided therein for operative engagement with the connecting portion of the IC card when the IC card is loaded in a predetermined position in the main body, so that the connecting portions are electrically connected;

a card holder for guiding a loading and removing direction of the IC card; and an opening and closing lid, wherein the card holder is disposed between the main body and the opening and closing lid and is operable substantially independently of the main body and the opening and closing lid.

2. The IC card loading device according to claim 1, wherein the card holder is constructed and arranged to move to a predetermined position upon an opening operation of the opening and closing lid, and determines a loading and removing direction of the IC card.

3. The IC card loading device according to claim 1, further comprising a fixing member for fixing the IC card in said predetermined position so that the connecting portion of the main body and the connecting portion of the IC card are electrically connected, wherein the fixing of the IC card is released in response to an opening operation of the opening and closing lid, and the IC card is fixed in position in response to a closing operation of the opening and closing lid.

4. The IC card loading device according to claim 1, further comprising:

a change-over switch for changing over a conductive state of an electrical signal between the connecting portion of the main body of the device and the connecting portion of the IC card;

a switch operating member for operating the change-over switch in response to an opening operation of the opening and closing lid so that conduction of an electrical signal between the connector portion of the main body and the connector of the IC card is disabled; and a fixing member for fixing the IC card in said predetermined position so that the connecting portion of the main body and the connecting portion of the IC card are electrically connected when the IC card is loaded, wherein the fixing of the IC card is released in response to the opening operation of the opening and closing lid after the change-over switch is operated by the switch operating member and the conduction of the electrical signal is disabled.

5. The IC card loading device according to claim 3, wherein the fixing member has a flat plate portion which receives a bottom surface of the IC card, and a top surface of the flat plate portion and a top surface of a bottom portion of the card holder are substantially on a same plane when the IC card is loaded.

6. The IC card loading device according to claim 5, wherein the fixing member releases the IC card from its fixed position by a movement of the plate member to a predetermined position in response to the opening operation of the opening and closing lid.

7. The IC card loading device according to claim 1, further comprising a positioning member for positioning the IC card in a vertical direction by contacting a head of the IC card when the IC card is loaded in the device, and by pushing a front end portion of the IC card, wherein the positioning member includes a rotation axis portion for rotatably supporting the opening and closing lid.

8. The IC card loading device according to claim 7, wherein the card holder moves to a predetermined position determined by contact of the card holder and the positioning member, with an opening operation of the opening and closing lid.

9. The IC card loading device according to claim 1, further comprising;

a change-over switch for changing over a conductive state of an electrical signal between the connecting portion of the main body and the connecting portion of the IC card; and a switch operating member provided on the opening and closing lid for operating the change-over switch in response to an opening operation and a closing operation of the opening and closing lid, and for determining an opening angle of the opening and closing lid.

10. The IC card loading device according to claim 3, further comprising an engaging member for holding an opening state of the opening and closing lid in a state that the fixing of the position of the IC card is released, the engaging member being provided on the main body and having a predetermined shape which can be engaged with the fixing member.

11. The IC card loading device according to claim 3, wherein the fixing member does not release the fixed IC card from its fixed position until the opening and closing lid reaches a predetermined position when being opened, and releases the fixed card after the opening and closing lid has passed said predetermined position.

12. An IC card loading device for loading an IC card having a connecting portion, comprising:

a main body having a connecting portion provided therein and which is connected to the connecting portion of the IC card when the IC card is loaded in a predetermined position relative to the main body, so that the connecting portions are electrically connected;

an opening and closing lid;

a card holder for guiding a loading and removing direction of the IC card, the card holder being positioned between the main body and the opening and closing lid, and the card holder being operable independently of the main body and the opening and closing lid;

an urging member for urging the card holder with an urging force toward a predetermined position, with an opening operation of the opening and closing lid;

a fixing member for fixing the IC card in said predetermined position so that the connecting portion of the main body of the device and the connecting portion of the IC card are electrically connected when the IC card is loaded, wherein the fixing of the position of the IC card is released in response to the opening operation of the opening and closing lid; and a pushing member for pushing the card holder in the acting direction of the urging force, the pushing member contacting the card holder in response to the opening operation of the opening and closing lid after the fixing member has released the IC card.

13. A holding mechanism for fixing in a predetermined position a movable member that is being urged in a certain direction by an urging force, comprising:

a fixing member for fixing the movable member against the urging force in the predetermined position;

a releasing member for releasing the fixing of the fixing member; and a pushing member for pushing the movable member, to assist the urging force, in the direction of the urging force after the fixing member has been released by the releasing member.

14. A holding mechanism according to claim 13, wherein the pushing member and the releasing member are constructed and arranged so as to operate together.

* * * * *